(12) United States Patent
Reily et al.

(10) Patent No.: US 10,863,277 B2
(45) Date of Patent: Dec. 8, 2020

(54) SYSTEMS AND METHODS FOR CONTROLLING ELECTRONIC DEVICES

(71) Applicant: Bose Corporation, Framingham, MA (US)

(72) Inventors: Todd Richard Reily, North Reading, MA (US); Daniel Winchell Tellier, Pepperell, MA (US); Daniel Buckley, Newton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/295,717

(22) Filed: Mar. 7, 2019

(65) Prior Publication Data

US 2020/0288247 A1    Sep. 10, 2020

(51) Int. Cl.
| | |
|---|---|
| *H04R 5/02* | (2006.01) |
| *H04R 5/033* | (2006.01) |
| *H04R 5/04* | (2006.01) |
| *G06F 3/16* | (2006.01) |
| *G06F 3/01* | (2006.01) |

(52) U.S. Cl.
CPC ............ *H04R 5/033* (2013.01); *G06F 3/017* (2013.01); *G06F 3/16* (2013.01); *H04R 5/04* (2013.01); *H04R 2430/01* (2013.01); *H04R 2460/01* (2013.01)

(58) Field of Classification Search
CPC ........... H04R 5/033; H04R 5/04; G06F 3/017; G06F 3/16
See application file for complete search history.

(56) References Cited

U.S. PATENT DOCUMENTS

| | | |
|---|---|---|
| 8,238,567 B2 | 8/2012 | Burge et al. |
| 8,238,570 B2 | 8/2012 | Johnson, Jr. et al. |
| 8,243,946 B2 | 8/2012 | Burge et al. |
| 8,699,719 B2 | 4/2014 | Johnson, Jr. et al. |
| 9,582,081 B1 * | 2/2017 | Costa .................. G02B 27/017 |
| 9,743,170 B2 | 8/2017 | Yamkovoy |
| 9,838,812 B1 | 12/2017 | Shetye et al. |

(Continued)

OTHER PUBLICATIONS

International Search Report and The Written Opinion of The International Searching Authority, International Application No. PCT/US2020/020642, pp. 1-13, dated May 4, 2020.

*Primary Examiner* — Simon King
(74) *Attorney, Agent, or Firm* — Bond, Schoeneck & King, PLLC (57) ABSTRACT

An audio system including a wearable audio device having a sensor to determine a first motion of the first wearable device from a first orientation to a second orientation, a first peripheral device, a first input arranged on, in, or in communication with the wearable audio device or the first peripheral device, and circuitry connected to the wearable audio device or the first peripheral device. The circuitry is arranged to: receive the first input while the first wearable audio device is in the first orientation; receive the first input while the first wearable audio device is moved via the first motion to the second orientation; determine that the first input has been released during or after the first motion; and, adjust a setting of the wearable audio device or the first peripheral device based at least in part on the first motion from the first orientation to the second orientation.

10 Claims, 7 Drawing Sheets

(56) References Cited

U.S. PATENT DOCUMENTS

| | | | |
|---|---|---|---|
| 9,860,626 B2 | 1/2018 | Ergezer et al. | |
| 9,924,255 B2 | 3/2018 | Patel et al. | |
| 10,045,111 B1 | 8/2018 | Bonner et al. | |
| 10,080,092 B2 | 9/2018 | Shetye et al. | |
| 10,257,602 B2 | 4/2019 | Kofman | |
| 2008/0130923 A1 | 6/2008 | Freeman | |
| 2012/0002822 A1 | 1/2012 | Peissig et al. | |
| 2013/0095924 A1* | 4/2013 | Geisner | G06F 3/012 463/32 |
| 2013/0329183 A1* | 12/2013 | Blum | G02C 11/10 351/158 |
| 2016/0080874 A1* | 3/2016 | Fullam | H04R 25/407 381/313 |
| 2016/0349849 A1* | 12/2016 | Kwon | G06F 3/011 |
| 2017/0195795 A1 | 7/2017 | Mei et al. | |
| 2018/0014107 A1* | 1/2018 | Razouane | G10L 21/02 |
| 2018/0036887 A1* | 2/2018 | Shim | B25J 11/0015 |
| 2019/0041978 A1* | 2/2019 | Loh | G06F 3/012 |
| 2019/0052951 A1 | 2/2019 | Kofman et al. | |
| 2019/0069114 A1 | 2/2019 | Tai et al. | |
| 2019/0113774 A1* | 4/2019 | Anderson | G02C 5/143 |
| 2020/0045491 A1* | 2/2020 | Robinson | H04R 5/033 |

* cited by examiner

SYSTEMS AND METHODS FOR CONTROLLING ELECTRONIC DEVICES

BACKGROUND

Aspects and implementations of the present disclosure are generally directed to systems and methods for control of electronic devices, for example, wearable audio devices.

SUMMARY OF THE DISCLOSURE

The present disclosure relates to devices and systems capable of controlling or adjusting a device or program setting based at least in part on sensor data obtained via a sensor arranged on, in, or in communication with a wearable audio device.

In one aspect, a wearable audio device is provided, the wearable audio device including a first input arranged on, in, or in communication with the first wearable audio device, a sensor arranged to determine a first motion of the first wearable audio device from a first orientation to a second orientation, and circuitry arranged to: receive the first input while the first wearable audio device is in the first orientation; receive the first input while the first wearable audio device is moved via the first motion to the second orientation; determine that the first input has been released during or after the first motion; and, adjust a setting of the wearable audio device based at least in part on the first motion from the first orientation to the second orientation.

In an aspect, the first input is a touch capacitive sensor.

In an aspect, the first input is a first gesture of a user.

In an aspect, the first gesture is selected from: a facial expression of a user; an eye movement of the user, or a motion of the user's jaw or teeth.

In an aspect, the first input is a voice input received at a first microphone connected to the wearable audio device.

In an aspect, the wearable audio device comprises a first speaker arranged to produce a first audio signal at a first volume.

In an aspect, the first motion comprises a rotation of the wearable audio device about an imaginary axis through the wearable device.

In an aspect, the adjusting of the setting of the wearable audio device comprises: increasing or decreasing the first volume of the audio signal proportionately to a degree of the rotation of the wearable audio device about the imaginary axis.

In an aspect, the adjusting of the setting of the wearable audio device comprises: selecting a level of Active Noise Reduction (ANR).

In an aspect, the adjusting of the setting can be a selection of a preset user routine from plurality of preset user routines.

In an aspect, an audio system is provided, the audio system including a wearable audio device having a sensor arranged to determine a first motion of the first wearable audio device from a first orientation to a second orientation, a first peripheral device, a first input arranged on, in, or in communication with the wearable audio device or the first peripheral device, and circuitry connected to the wearable audio device or the first peripheral device. The circuitry is arranged to: receive the first input while the first wearable audio device is in the first orientation; receive the first input while the first wearable audio device is moved via the first motion to the second orientation; determine that the first input has been released during or after the first motion; and, adjust a setting of the wearable audio device or the first peripheral device based at least in part on the first motion from the first orientation to the second orientation.

In an aspect, the first input is a touch capacitive sensor.

In an aspect, the first input is a first gesture of a user.

In an aspect, the first gesture is selected from: a facial expression of a user; an eye movement of the user, or a motion of the user's jaw or teeth.

In an aspect, the first input is a voice input received at a first microphone connected to the wearable audio device.

In an aspect, the wearable audio device comprises a first speaker arranged to produce a first audio signal at a first volume.

In an aspect, the first motion comprises a rotation of the wearable audio device about an imaginary axis through the wearable device.

In an aspect, the adjusting of the setting of the wearable audio device comprises: increasing or decreasing the first volume of the audio signal proportionately to a degree of the rotation of the wearable audio device about the imaginary axis.

In an aspect, the adjusting of the setting of the wearable audio device comprises: selecting a level of Active Noise Reduction (ANR).

In an aspect, the adjusting of the setting can be a selection of a preset user routine from plurality of preset user routines.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to devices and systems capable of controlling or adjusting a device or program setting based at least in part on sensor data obtained via a sensor arranged on, in, or in communication with a wearable audio device.

Figure 1:
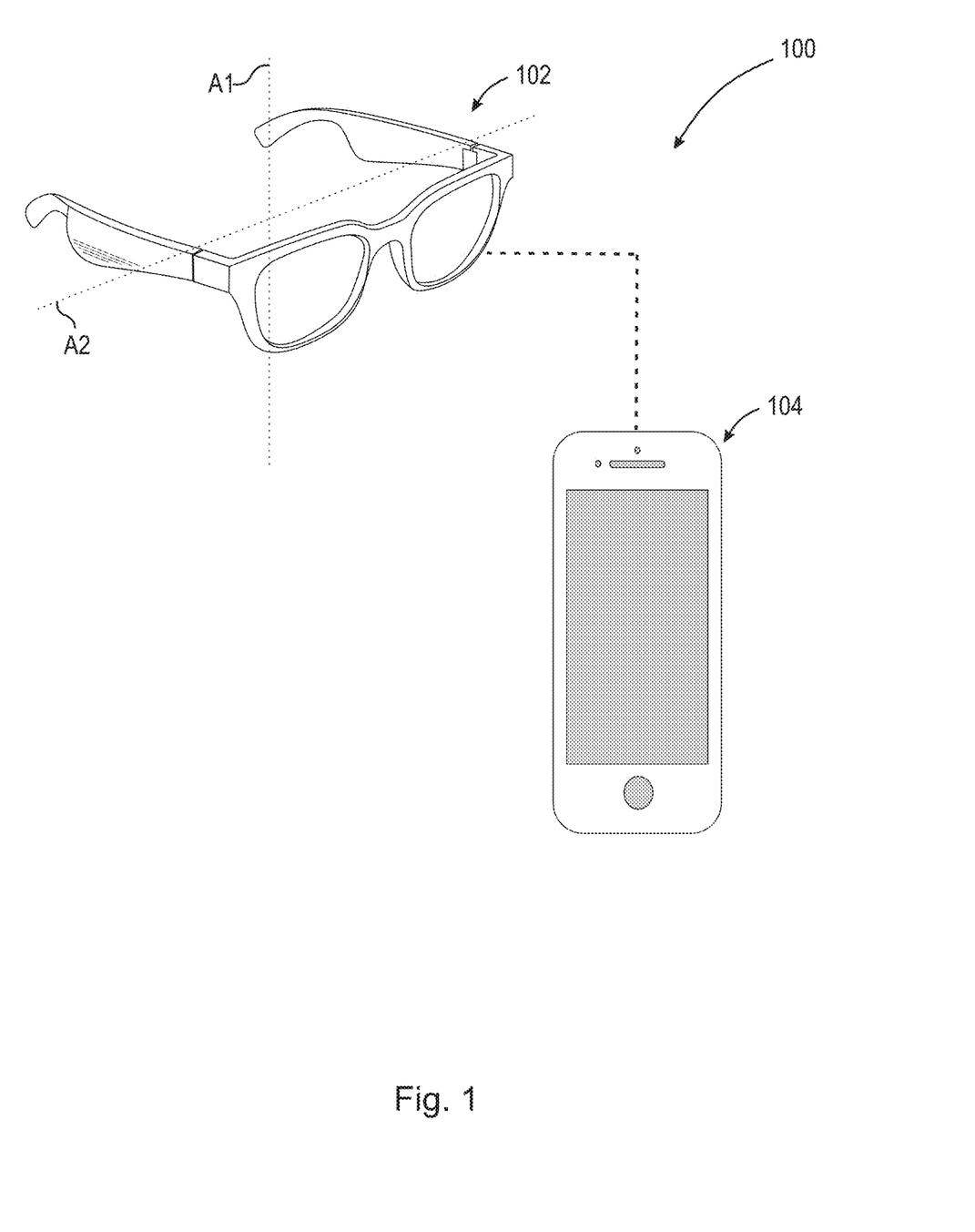
FIG. 1 is a schematic view of an audio system according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an audio eyeglasses form factor, in other examples the headset may be an in-ear, on-ear, around-ear, or near-ear headset. In some examples, a wearable audio device may be an open-ear device that includes an acoustic driver to radiate acoustic energy towards the ear while leaving the ear open to its environment and surroundings.

The following description should be read in view of FIGS. 1-6B. FIG. 1 is a schematic view of audio system 100 according to the present disclosure. Audio system 100 includes wearable audio device 102 and first peripheral device 104. It should be appreciated that, although illustrated in FIGS. 1-3 and 6A-6B as a pair of smart eyeglass frames, wearable audio device can be any device capable of establishing a wired or wireless connection with first peripheral device 104, e.g., wireless headphones. Additionally, although illustrated in FIGS. 1 and 4 as a smart phone, it should be appreciated that first peripheral device 104 can be any device capable of establishing a wired or wireless connection with wearable audio device 102, e.g., wireless speakers, a smart television, a personal computer, tablet, smart watch, etc.

Figure 2:
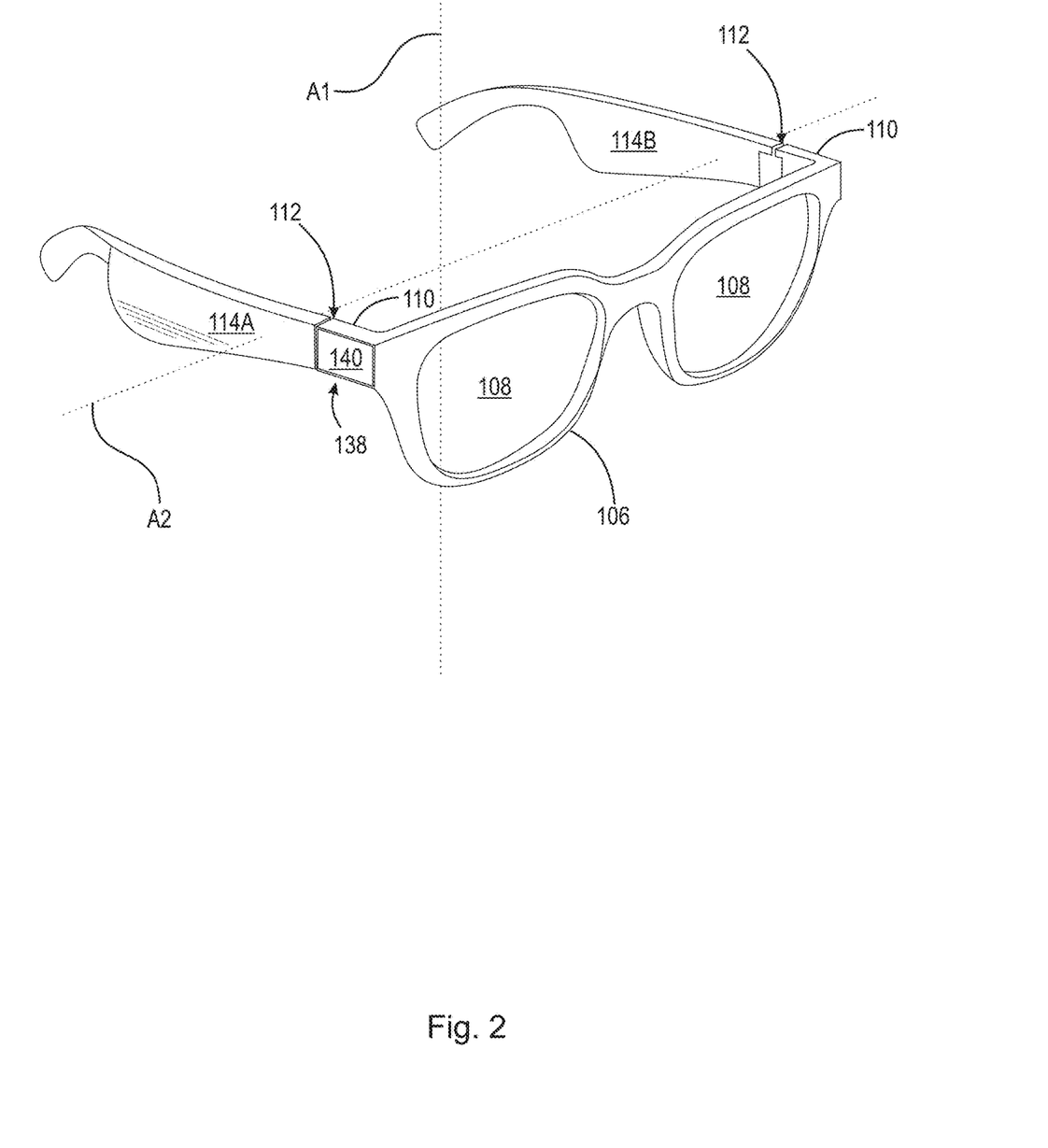
FIG. 2 is a right-side perspective view of a wearable audio device according to the present disclosure.

In one example, as illustrated in FIG. 2, wearable audio device 102 is a pair of smart eyeglasses having rims 106, lenses 108, end pieces 110, hinges 112, a first temple 114A and a second temple 114B. Rims 106 can be selected from any style rims known in the art, e.g., round, oval, square, rectangular, or any other conceivable rim shape. Lenses 108 can be prescription lenses, non-prescription lenses or tinted lenses (sunglasses). It should be appreciated that whatever lenses are chosen can be formed or cut to fit within rims 106. At opposing ends of rims 106, wearable audio device 102 includes end pieces 110 which are bent at an angle with respect to rims 106. Each end piece 110 is connected to a temple 114 via a hinge, e.g., first temple 114A and second temple 114B. Each temple is arranged to span from rims 106 to and rest on the top of a user's ear while in use.

Figure 3:
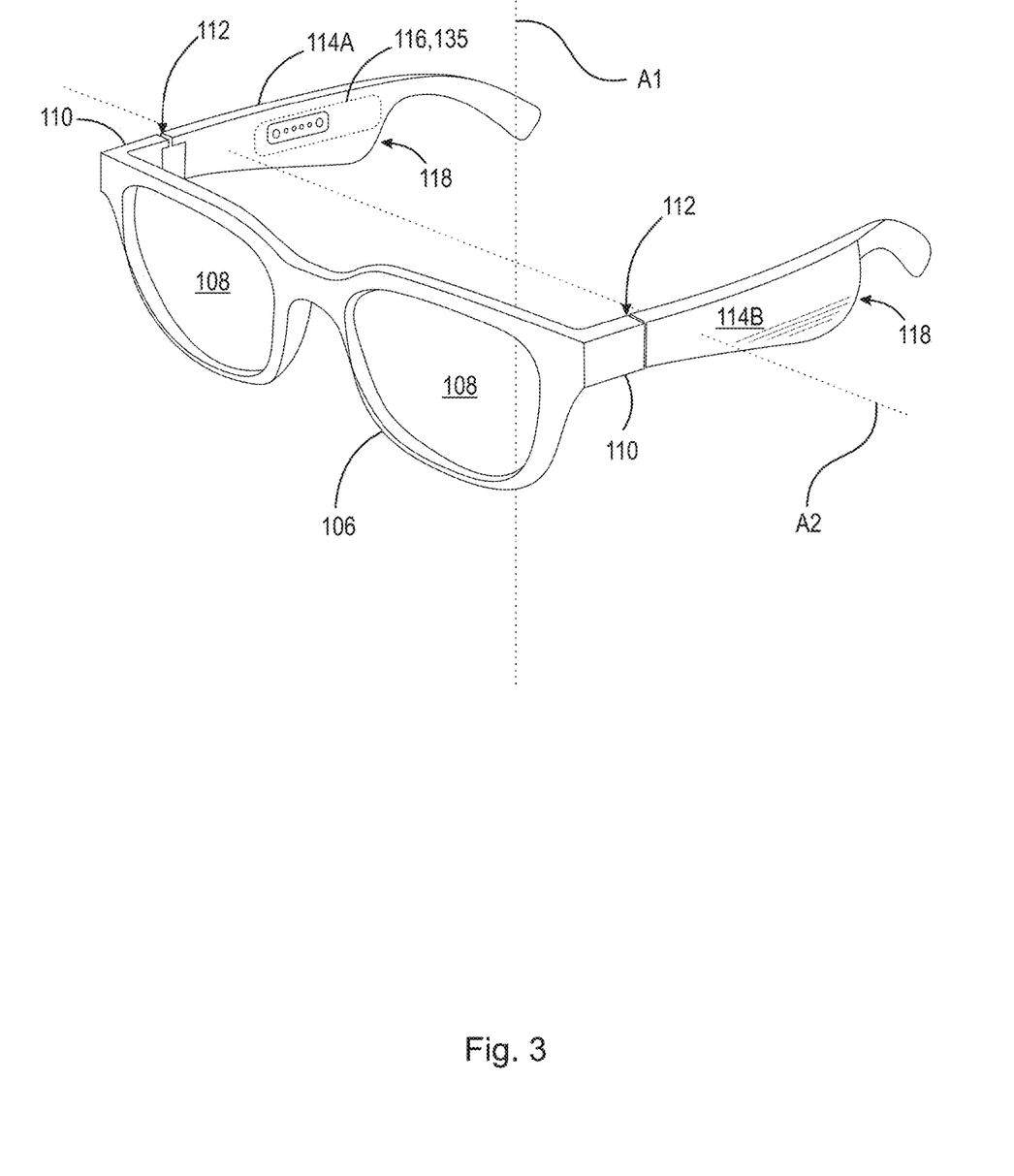
FIG. 3 is a left-side perspective view of a wearable audio device according to the present disclosure.
Figure 5A:
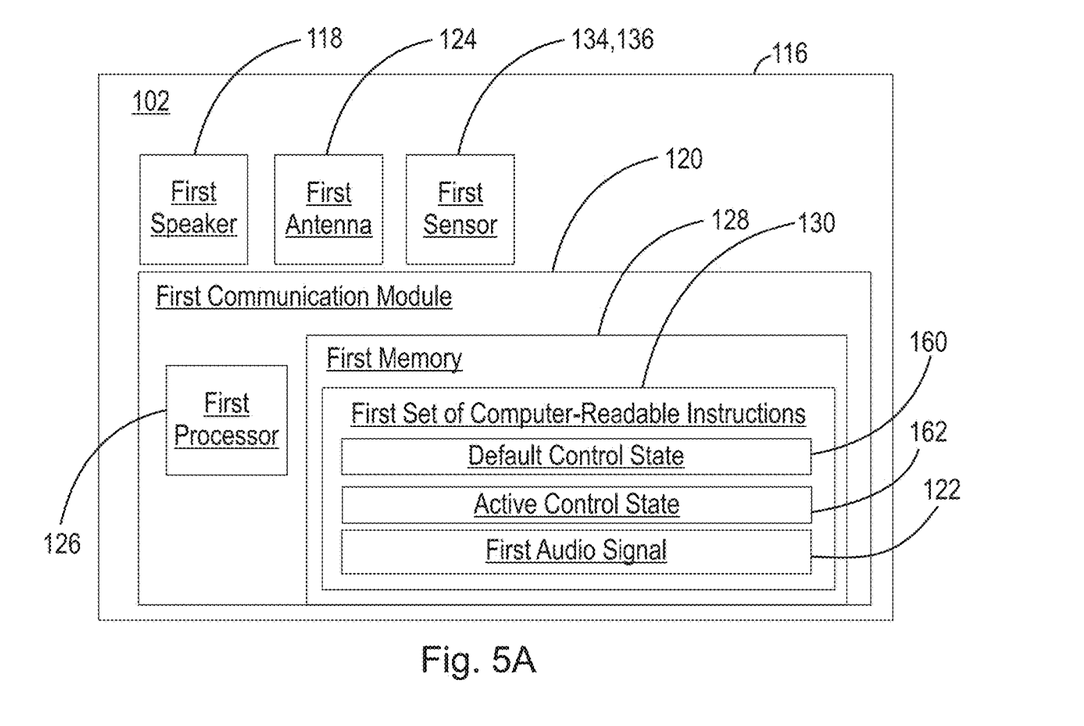
FIG. 5A is a schematic illustration of the electronic components of a wearable audio device according to the present disclosure.

As illustrated in FIG. 3, first wearable audio device 102 also includes first circuitry 116. First circuitry 116 includes speaker 118 and first communication module 120 (shown in FIG. 5A). First speaker 118 is arranged to produce a first audio signal at a first volume, i.e., first audio signal 122 (shown in FIG. 5A) at first volume V1 (not shown) proximate at least one ear of a user in response to audio data sent and/or received from first communication module 120. As illustrated in FIG. 3, first speaker 118 can be integrated within first temple 114A and/or second temple 114B and proximate to where a user's ear is positioned during use of wearable audio device 102. First communication module 120 (shown in FIG. 5A) is arranged to send and/or receive data from an antenna, e.g., first antenna 124 as shown in FIG. 5A. The data received can be, e.g., audio data or communication data sent and/or received from a plurality of external devices, e.g., first peripheral device 104. It should be appreciated, that first communication module 120 can be operatively connected to a first processor 126 (shown in FIG. 5A) and first memory 128 (shown in FIG. 5A) operatively arranged to execute and store a first set of non-transitory computer-readable instructions 130 (shown in FIG. 5A), as well as a battery or other power source (not shown). Furthermore, wearable audio device 102 may further include a first microphone 132 (not shown), or an array of microphones, arranged on, in, or in communication with wearable audio device 102 and arranged to obtain voice data from a user.

Furthermore, first wearable audio device 102 includes a first sensor 134 (shown in FIG. 5A) arranged on or in first wearable audio device 102. First sensor 134 can be selected from: a gyroscope, an accelerometer, a magnetometer, or any other sensor capable of determining the position, angular velocity, orientation, acceleration, or direction with respect to a magnetic force of first wearable audio device 102. First sensor 134 is arranged to obtain sensor data 136 (schematically shown in FIG. 5A) and relay sensor data 136 to first communication module 120. As will be described below, first wearable audio device 102 and/or first peripheral device 104 can utilize sensor data 136 to obtain an orientation and a motion of first wearable audio device 102 while in use, e.g., first orientation 164, second orientation 176, and first motion 174 (all discussed below).

As shown in FIG. 2, first wearable audio device 102 further includes a first user interface 138 having at least one user input, e.g., first user input 140. While first user interface 138 is illustrated in FIG. 2 as being on end pieces 110, first user interface 138 could be located at any suitable location on first wearable audio device 102, e.g., rims 106, lenses 108, hinges 112, first temple 114A, second temple 114B, etc. First user input 140 can be selected from: a touch capacitive sensor, a mechanical button, a slideable switch, or any other conceivable input which can be obtained from an action of a user. Additionally, although not discussed in detail, first user input 140 can be a signal generated by first sensor 134 such that a motion or a gesture, i.e., first gesture 141, made by the user can serve as an input to first wearable audio device 102. First input 140 can also be a signal generated by a second sensor 135 (shown in FIG. 3) such as a pressure or deformation sensor, an Electrooculography (EOG) sensor, an Electromyography (EMG) sensor, an Electrocardiogram (EKG/ECG) sensor, a piezoelectric sensor, an electrically active film, or any other sensor that can translate and transmit physiological events that take place on or in a user's body to wearable audio device 102. A non-limiting list of gestures that may be detected by second sensor 135 includes: a smile; a frown; a wink or blink; eye movement (e.g., movement of eyes back and forth or up and down); an eyebrow raise; a clenching of a user's jaw; movement of a user's jaw forward, backward, or to one side; raising of a user's ears; an opening of a user's mouth; flaring of a user's nostrils; movement of a user's cheeks; etc. In one example, first gesture 141 can be selected from a movement of a user's eye or the muscles on a user's face, e.g., a blink of the user's eye, such that the act of blinking can be used as first input 140 and can operate to switch wearable audio device 102 from default control state 160 (discussed below) to active control state 162 (discussed below) and vice versa.

Furthermore, it should be appreciated that the voice data obtained from first microphone 132 (not shown) can also serve as an input for first wearable audio device 102. In one example, as shown in FIG. 2, first user input 140 is a mechanical button arranged on the end piece 110 of first temple 114A of wearable audio device 102. FIGS. 2-3 illustrate a right-side perspective view and a left-side perspective view, respectively, of first wearable audio device 102 having user first interface 138 and first user input 140. It should be appreciated that first interface 138 and first user input 140 can be arranged anywhere on, in, or in communication with wearable audio device 102 including: first temple 114A, second temple 114B, rims 106, or either hinge 110, in any conceivable arrangement.

Figure 4:
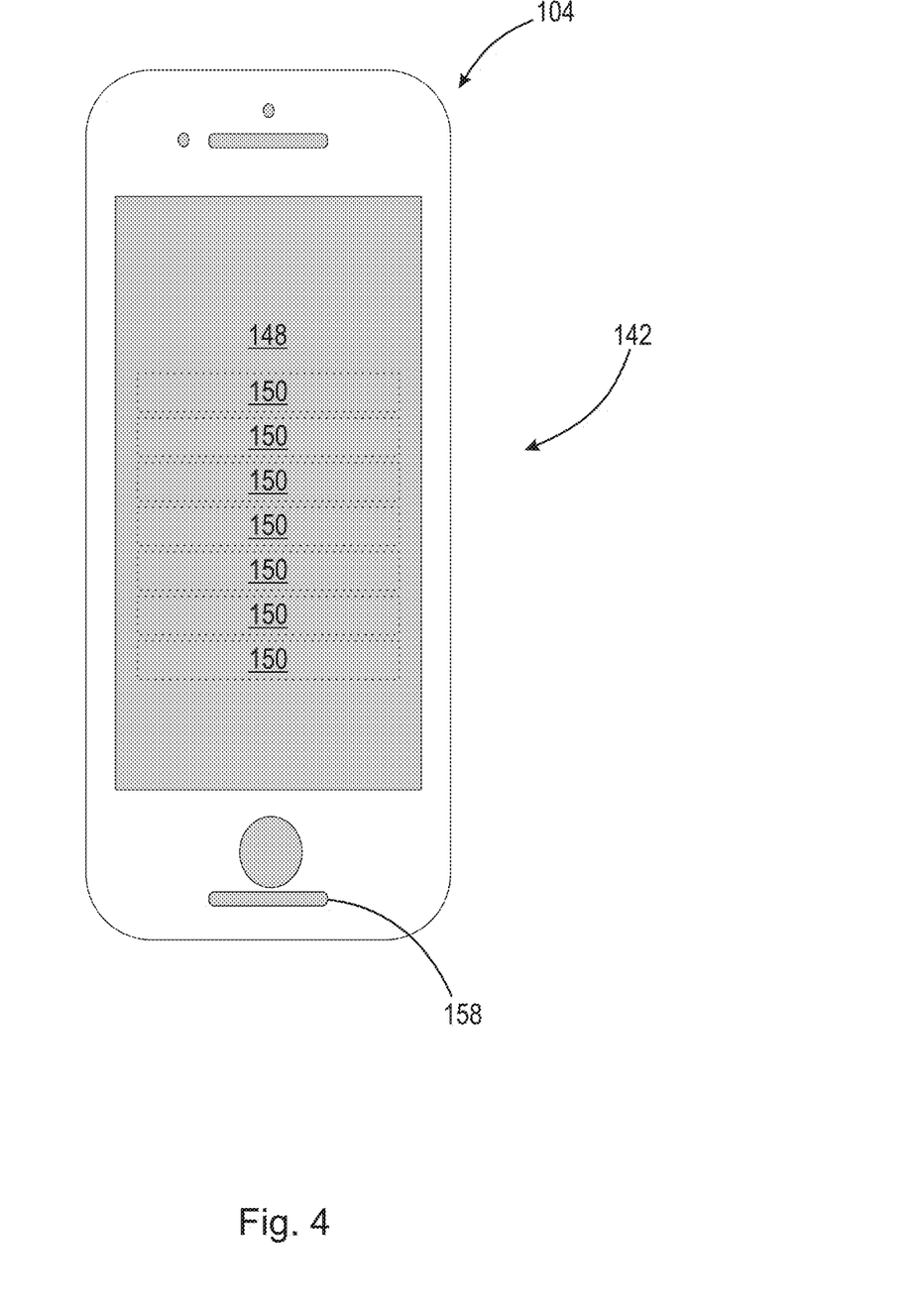
FIG. 4 is a front schematic view of a first peripheral device according to the present disclosure.
Figure 5B:
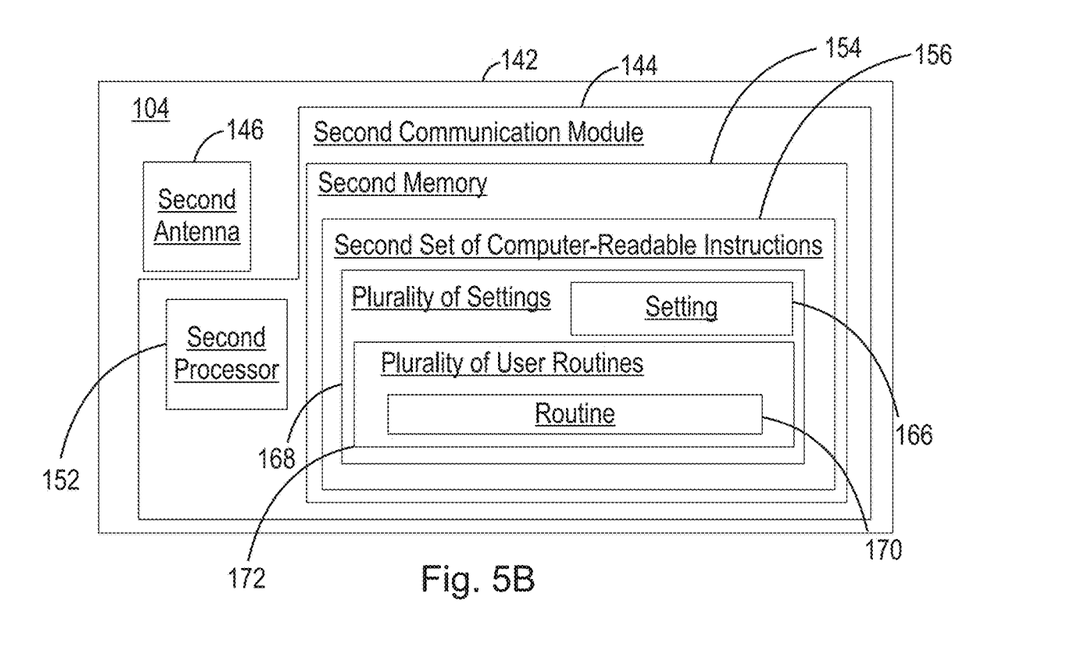
FIG. 5B is a schematic illustration of the electronic components of a first peripheral device according to the present disclosure.
Figure 6A:
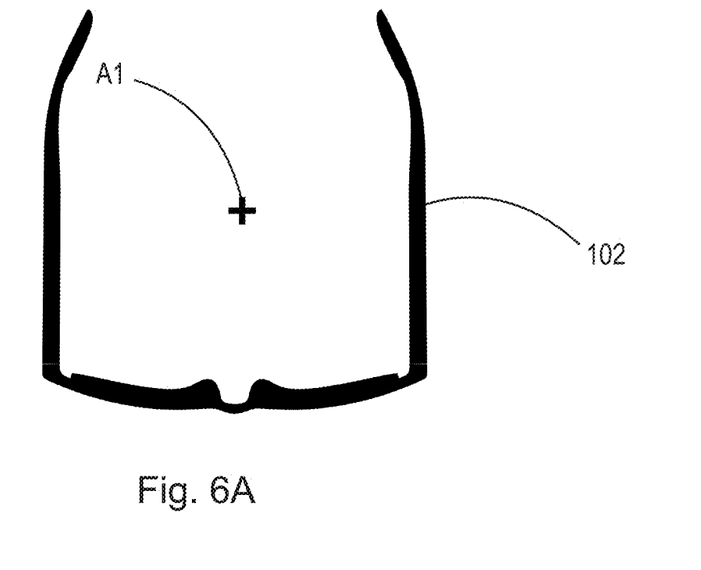
FIG. 6A is a top plan view of a wearable audio device in a first orientation according to the present disclosure.
Figure 6B:
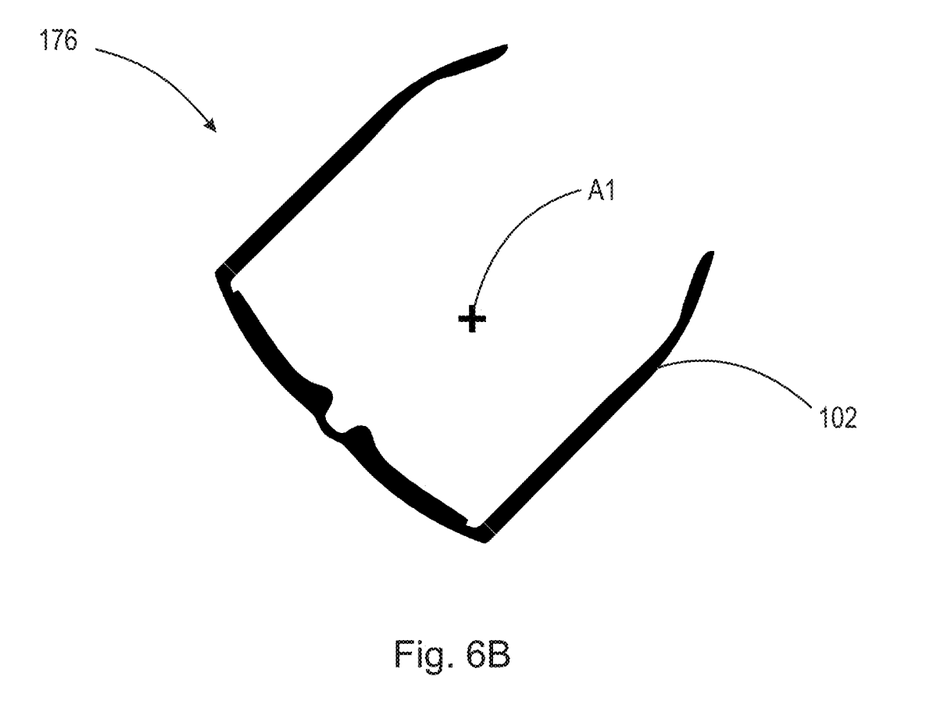
FIG. 6B is a top plan view of a wearable audio device in a second orientation according to the present disclosure.

FIG. 4 illustrates a front schematic view of first peripheral device 104 according to the present disclosure. First peripheral device 104 includes second circuitry 142 which can include second communication module 144 (shown in FIG. 5B) arranged to send and/or received data, e.g., audio data or communication data via a second antenna 146 (shown in FIG. 5B). First peripheral device 104 further includes second user interface 148 having at least one second input 150, and second processor 152 (shown in FIG. 5B) and second memory 154 (shown in FIG. 5B) arranged to execute and store a second set of non-transitory computer-readable instructions 156 (shown in FIG. 5B). Second memory 154 and/or first memory 128 of wearable audio device 102 can include a plurality of settings 168 and/or a plurality of user routines 172, which will be discussed below in detail. Furthermore, although not discussed in detail, second user input 150 can be a signal generated by inertial sensors located on or within first peripheral device 104, e.g., an accelerometer, a gyroscope, and/or a magnetometer, such that a motion or a gesture, e.g., first gesture 141 discussed above, made by the user can serve as an input for first peripheral device 104. Furthermore, first peripheral device may also include a microphone, i.e., second microphone 158 (shown in FIG. 4), or an array of microphones, arranged to receive voice data from a user.

During operation of audio system 100, first wearable audio device 102 or first peripheral device 104 are arranged to establish a first wired or wireless connection. For example, first antenna 124 of first communication module 120 may initiate/request a wired or wireless connection with first peripheral device 104 where the request is received and accepted via second antenna 146 of second communication module 144. Conversely, second antenna 146 of second communication module 144 may initiate/request the wired or wireless connection with first wearable audio device 102 where the request is received an accepted via first antenna 124 of first communication module 120. In one example, the connection is a wireless connection established between first communication module 120 and second communication module 144 using a wireless protocol selected from: a Bluetooth protocol, a Bluetooth Low-Energy (BLE) protocol, a ZigBee protocol, Near-Field Magnetic Induction (NFMI), Near-Field Electromagnetic Induction (NFEMI), a Wi-Fi (IEEE 802.11) protocol, or any other protocol for establishing a wireless connection between first wearable device 102 and first peripheral device 104. It should further be appreciated that the connection may be a physical connection made between first wearable audio device 102 and first peripheral device 104, e.g., via a cable or cord arranged to send and/or receive audio data and communication data between first wearable audio device 102 and first peripheral device 104.

Once the connection between wearable audio device 102 and first peripheral device 104 is established, first wearable audio device 102 is in a default control state, i.e., default control state 160. In default control state 160, sensor data 136 obtained from first sensor 134 can be sent from first wearable audio device 102 and received by first peripheral device 104 such that second circuitry 142 can utilized sensor data 136 with, e.g., a third-party application stored and executed on second memory 154 and second processor 152, respectively.

While in default control state 160, a user may, for example, engage first user input 140 located on end piece 110 of first temple 114A of wearable audio device 102. Upon engaging first user input 140, wearable audio device 102 switches from the default control state 160 to active control state 162, and, using sensor data 136 obtained from first sensor 134, determines and obtains an orientation of wearable audio device 102, i.e., first orientation 164 (shown in FIG. 6A). First orientation 164 can be stored in first memory 128 of wearable audio device 102, second memory 154 of first peripheral device 104, or the memory of another external device, or a memory accessible via a network connection (e.g., cloud-based connection). While wearable audio device 102 remains in active control state 162, i.e., as long as first user input 140 remains engaged, sensor data 136 obtained from first sensor 134 is utilized to modify or adjust a setting 166 of plurality of settings 168 and/or switch between routines 170 of a plurality of user routines 172. Setting 166 of plurality of settings 168 can be selected from: increasing or decreasing first volume V1 of audio signal 122; activating or deactivating or otherwise selecting a level of Active Noise Reduction (ANR); switching between routines 170 of plurality of user routines 172; start or play the first audio signal 122; stop first audio signal 122; pause first audio signal 122; resume first audio signal 122; switch or cycle between tracks or audio files; answer a phone call; decline a phone call; accept a notification; dismiss a notification; access a Virtual Personal Assistant (VPA) program (e.g., Amazon Alexa, Google Assistant, Apple Siri); or any other setting related to programs or applications that utilize audio data. Each routine 170 of plurality of user routines 172 are intended to be various combinations of preset user settings or default settings which may be cycled through during use of the device. For example, a user may have a preconfigured or predefined routine 170 of plurality of routines 172 which establishes a certain volume and/or level of active noise reduction, e.g., during exercise. In this example, the user may want a predefined volume and predefined level of active noise reduction (as well as other relevant settings) which maximizes the audibility of the user's music, while also allowing some external noise to alert the user to oncoming danger. It should be appreciated that the user may establish a plurality of routines 172 which are situationally specific for various situations a user may encounter. In one example, while the wearable audio device 102 remains in the active control state 162, i.e., while the user remains engaged with first user input 140, the user may generate a first motion 174, e.g., a rotation horizontally about a first imaginary vertical axis A1 (illustrated in FIGS. 1, and 6A-6B), a rotation vertically about a second imaginary vertical axis A2 (illustrated in FIG. 1), a revolution, a roll, a twist, or any conceivable combination thereof. Upon the user disengaging with first user input 140, wearable audio device 102 switches from active control state 162 to default control state 160, and, using sensor data 136 obtained from first sensor 134, determines and obtains an orientation of wearable audio device 102, i.e., second orientation 176 (shown in FIG. 6B). Second orientation 176 can be stored in first memory 128, second memory 154, the memory of another external device, or a memory accessible via a network connection (e.g., cloud-based connection). It should be appreciated that first motion 174 between first orientation 164 and second orientation 176 is utilized to modify or adjust setting 166 or cycle between routines 170 of plurality of user routines 172. It should also be appreciated that the magnitude of modification or adjustment of, e.g., setting 166, may be proportional to a degree of motion or degree of rotation 178, discussed below, of wearable audio device 102 during first motion 174 between first orientation 164 and second orientation 176.

In one example, first user input 140 is a mechanical button located on end piece 110 of first temple 114A of wearable audio device 102. During use of wearable audio device 102, wearable audio device 102, via audio data obtained by the wired or wireless connection between first wearable audio device 102 and first peripheral device 104, is arranged to produce or generate first audio signal 122 through first speaker 118 at first volume V1. Initially, wearable audio device 102 is in default control state 160 where sensor data 136 obtained by first sensor 134 may be utilized by a third-party program, e.g., an augmented reality program. While wearable audio device 102 is in the default control setting state 160, the user may engage or depress first user input 140. Upon engaging or depressing first user input 140, wearable audio device 102 switches from default control state 160 to active control state 162 and determines and obtains, using sensor data 136 obtained from first sensor 134, first orientation 164 of first wearable audio device 102. In this example, first orientation 164 corresponds with the user's head being in a neutral position, i.e., look horizontally forward parallel with the ground upon which the user would be standing or sitting while using wearable audio device 102 (illustrated in FIG. 6A). While in the active control state 162, i.e., while the user is maintaining engagement with first user input 140, a motion of the user's head along with motion of wearable audio device 102, i.e., first motion 174, is utilized to modify or adjust setting 166. When the user releases or disengages with first user input 140, wearable audio device 102 switches from active control state 162 to default control state 160 and determines and obtains, from sensor data 136 obtained via first sensor 134, an orientation of wearable audio device 102, i.e., second orientation 176. In this example, setting 166 is a volume setting associated with first audio signal 122, second orientation 176 is a non-neutral position, e.g., a position of a user's head looking to the right with respect to the neutral position about imaginary vertical axis A1 (shown in FIG. 6B), and first motion 174 (not shown) is a horizontal rotation about imaginary vertical axis A1 from first orientation 164 to second orientation 176. As wearable audio device 102 is moved via first motion 174 the first volume, i.e., first volume V1 can be modified or adjusted proportionately to a degree of rotation 178 of wearable audio device 102 about imaginary vertical axis A1. In this example, a user may have a comfortable range of neck rotation of approximately 150 degrees, i.e., 75 degrees of rotation to the left with respect to imaginary vertical axis A1 and 75 degrees of rotation to the right with respect to imaginary vertical axis A1. Sensor 134 may be arranged to obtain changes in sensor data 136 corresponding to changes of approximately 10 degrees of rotational motion to the left or to the right of first orientation 164. In this example, first volume V1 may be increased or decreased proportionately to the degree of rotation 178 of wearable audio device 102, e.g., first volume V1 can be increased incrementally for each 10 degree rotation to the right with respect to first orientation 164. Conversely, first volume V1 can be decreased incrementally for each 10 degree rotation to the left with respect to first orientation 164. It should be appreciated that the foregoing description could be utilized to adjust any setting that is incremented and/or decremented, e.g., adjusting a level of active noise reduction from a maximum level to a minimum level, and to various points in between.

In one example, wearable audio device 102 is arranged to cycle through predefined or predetermined routines 170 of a plurality of user routines 172. Similarly, here first orientation 164 corresponds with a neutral head position of the user i.e., looking horizontally forward parallel with the ground upon which the user would be standing or sitting while using wearable audio device 102. Additionally, second orientation 176 is a non-neutral position, e.g., a position of user's head looking to the right with respect to the neutral position about imaginary vertical axis A1, and first motion 174 is a horizontal rotation about imaginary vertical axis A1 from first orientation 164 to second orientation 176. As wearable audio device 102 is moved via first motion 174, wearable audio device 102 is arranged to cycle through different routines 170 of plurality of user routines 172. The switch between each routine 170 can be in response to completion of the degree of rotation 178 of wearable audio device 102 about imaginary vertical axis A1. In this example, a user may have a comfortable range of neck rotation of approximately 150 degrees, i.e., 75 degrees of rotation to the left with respect to imaginary vertical axis A1 and 75 degrees of rotation to the right with respect to imaginary vertical axis A1. Sensor 134 may be arranged to obtain changes in sensor data 136 corresponding to changes of approximately 10 degrees of motion to the left or to the right of first orientation 164. In this example, the user may cycle between routines 170 of plurality of user routines 172 incrementally as wearable audio device completes every 10 degrees of rotation to the right with respect to first orientation 164. Conversely, may cycle through the available user routines of plurality of user routines 172 incrementally for each 10 degree rotation to the left with respect to first orientation 164.

In one example, the user may adjust setting 166 or cycle between routines 170 of plurality of user routines 172 by achieving a single threshold of rotation. In this example, first orientation 164 corresponds with a neutral head position of the user i.e., looking horizontally forward parallel with the ground upon which the user would be standing or sitting while using wearable audio device 102. Additionally, second orientation 176 is a non-neutral position, e.g., a position of user's head looking to the right with respect to the neutral position about imaginary vertical axis A1, and first motion 174 is a horizontal rotation about imaginary vertical axis A1 from first orientation 164 to second orientation 176. As wearable audio device 102 is moved via first motion 174, wearable audio device 102 is arranged to cycle through different routines 170 of plurality of user routines 172. The switch between each routine 170 can be in response to completion of the degree of rotation 178 of wearable audio device 102 about imaginary vertical axis A1. In this example, a user may have a comfortable range of neck rotation of approximately 150 degrees, i.e., 75 degrees of rotation to the left with respect to imaginary vertical axis A1 and 75 degrees of rotation to the right with respect to imaginary vertical axis A1. Sensor 134 may be arranged to obtain changes in sensor data 136 corresponding to changes of, e.g., 30 degrees of motion to the left or to the right of first orientation 164. In this example, while in active control state 162, i.e., while first input 140 is engaged, the user may cycle between different settings 166 or different routines 170 of plurality of user routines 172 every time the user completes a rotation that hits the 30 degree rotation threshold to the right or the left with respect to first orientation 164. It should further be appreciated that, while the rotation of the meets the 30 degree rotational threshold to the right or the left of first orientation, wearable audio device 102 can be configured to continuously, or after a predetermined time limit, cycle through the available settings 166 until the user disengages from first input 140.

It should be appreciated that the foregoing description could be utilized to cycle through any user setting, file, folder, available devices capable of establishing a wired or wireless connection with wearable audio device, etc. For example, the user may, while in the active control state 162, cycle between available audio files or audio streams, available folders in a graphical user interface, or adjust any conceivable setting associated with wearable audio device 102 or first peripheral device 104. Additionally, although the foregoing description utilizes the engagement or disengagement of first user input 140 to switch wearable audio device 102 between the default control state 160 and active control state 162, it should be appreciated that any of the inputs described above could be utilized to switch wearable audio device 102 between the default control state 160 and active control state 162, e.g., second user input 150 of first peripheral device 104, voice data obtained by first microphone 132 or second microphone 158, etc. Furthermore, although, in one example, first sensor 134 is capable of discriminating rotational movements in increments of 10 degrees with respect to imaginary vertical axis A1, it should be appreciated that first sensor can be more or less precise, i.e., capable of discriminating rotational movements in increments ranging from 1-75 degrees.

Figure 7:
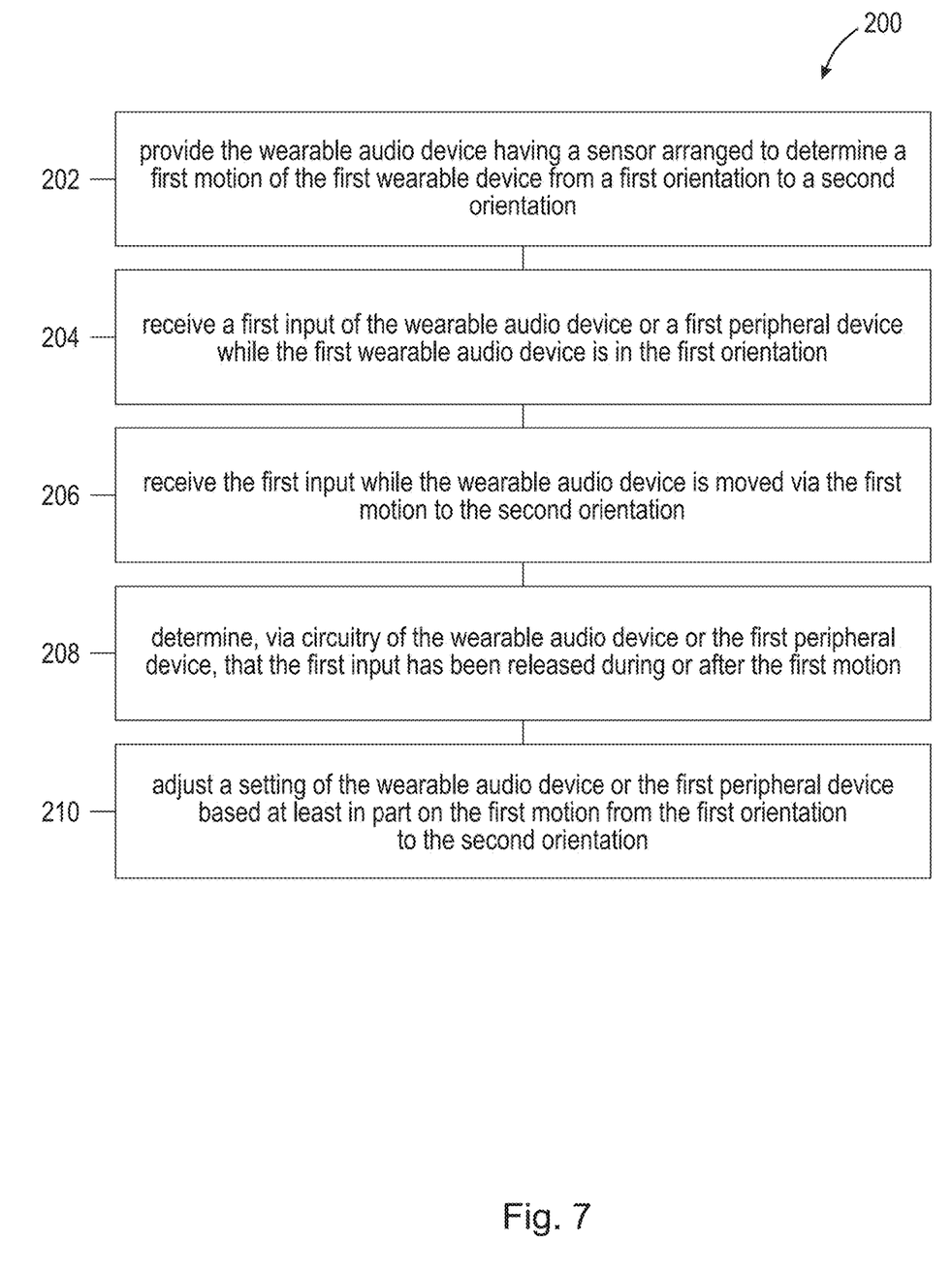
FIG. 7 is a flow-chart illustrating the steps of a method according to the present disclosure.

As illustrated in FIG. 7, the present disclosure includes a method of adjusting a user setting, i.e., method 200. Method 200 can include, for example: providing a wearable audio device 102 having a sensor 134 arranged to determine a first motion 174 of the first wearable audio device 102 from a first orientation 164 to a second orientation 176 (step 202); receiving a first input 140 of the wearable audio device 102 or a first peripheral device 104 while the first wearable device is in the first orientation 164 (step 204); receiving the first input 140 while the wearable audio device 102 is moved via the first motion 174 to the second orientation 176 (step 206); determining, via circuitry (116,142) of the wearable audio device 102 or the first peripheral device 104 that the first input 140 has been released during or after the first motion 174 (step 208); and, adjusting a setting 166 of the wearable audio device 102 or the first peripheral device 104 based at least in part on the first motion 174 from the first orientation 164 to the second orientation 176 (step 210).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A wearable audio device comprising:
    a first user input arranged on, in, or in communication with the first wearable audio device;
    a sensor arranged to determine a first motion of the first wearable audio device from a first orientation to a second orientation; and,
    circuitry arranged to:
        receive the first user input while the first wearable audio device is in the first orientation;
        receive the first user input while the first wearable audio device is moved via the first motion to the second orientation;
        determine that the first user input has been released during or after the first motion; and,
        adjust a setting of the wearable audio device based at least in part on the first motion from the first orientation to the second orientation and wherein the adjusting of the setting comprises: adjusting a first volume of an audio signal produced by a first speaker of the wearable audio device, selecting a level of Active Noise Reduction (ANR), or selecting a preset user routine from a plurality of preset user routines, and wherein the adjusting of the setting is proportional to a degree of motion of the first motion about an imaginary axis through the wearable device.

2. The wearable audio device of claim 1, wherein the first user input is a touch capacitive sensor.

3. The wearable audio device of claim 1, wherein the first user input is a first gesture of a user.

4. The wearable audio device of claim 3, wherein the first gesture is selected from: a facial expression of a user; an eye movement of the user, or a motion of the user's jaw or teeth.

5. The wearable audio device of claim 1, wherein the first user input is a voice input received at a first microphone connected to the wearable audio device.

6. An audio system comprising:
    a wearable audio device having a sensor arranged to determine a first motion of the first wearable device from a first orientation to a second orientation;
    a first peripheral device;
    a first user input arranged on, in, or in communication with the wearable audio device or the first peripheral device; and,
    circuitry connected to the wearable audio device or the first peripheral device, wherein the circuitry is arranged to:
        receive the first user input while the first wearable audio device is in the first orientation;
        receive the first user input while the first wearable audio device is moved via the first motion to the second orientation;
        determine that the first user input has been released during or after the first motion; and,
        adjust a setting of the wearable audio device or the first peripheral device based at least in part on the first motion from the first orientation to the second orientation and wherein the adjusting of the setting comprises: adjusting a first volume of an audio signal produced by a first speaker of the wearable audio device, selecting a level of Active Noise Reduction (ANR), or selecting a preset user routine from a plurality of preset user routines, and wherein the adjusting of the setting is proportional to a degree of motion of the first motion about an imaginary axis through the wearable device.

7. The audio system of claim 6, wherein the first user input is a touch capacitive sensor.

8. The audio system of claim 6, wherein the first user input is a first gesture of a user.

9. The audio system of claim 8, wherein the first gesture is selected from: a facial expression of a user; an eye movement of the user, or a motion of the user's jaw or teeth.

10. The audio system of claim 6, wherein the first user input is a voice input received at a first microphone connected to the wearable audio device.

* * * * *